United States Patent [19]

Lonn

[11] Patent Number: 5,497,604
[45] Date of Patent: Mar. 12, 1996

[54] SUPERVISOR SWITCH FOR TURF MOWER

[75] Inventor: Dana R. Lonn, Minneapolis, Minn.

[73] Assignee: The Toro Company, Minneapolis, Minn.

[21] Appl. No.: 191,796

[22] Filed: Feb. 3, 1994

[51] Int. Cl.$^6$ .................................................. A01D 34/60
[52] U.S. Cl. ............................... 56/10.2 H; 56/7; 56/11.9
[58] Field of Search ............................... 56/10.2 H, 6, 7, 56/11.1, 11.3, 11.9

[56] References Cited

U.S. PATENT DOCUMENTS

| | | | |
|---|---|---|---|
| 3,548,570 | 12/1970 | Knott et al. | 56/15 |
| 3,591,776 | 7/1971 | Sylvester | 235/92 |
| 4,332,127 | 6/1982 | Staiert et al. | 56/10.2 H |
| 4,887,415 | 12/1989 | Martin | 56/10.2 |
| 4,964,265 | 10/1990 | Young | 56/10.8 |

FOREIGN PATENT DOCUMENTS

| | | | |
|---|---|---|---|
| 1111702 | 9/1984 | U.S.S.R. | 56/10.2 H |
| 2155666 | 9/1985 | United Kingdom | 56/10.2 G |

*Primary Examiner*—Terry Lee Melius
*Attorney, Agent, or Firm*—Merchant, Gould, Smith, Edell, Welter & Schmidt

[57] ABSTRACT

The present invention provides for an automated supervisor switch device for maintaining an acceptable ground speed during cutting operations for a turf mower. The present invention does not interfere with the ground speed of the vehicle during cutting or non-cutting operations. In a preferred embodiment, an onboard controller and its attendant memory are provided with a predetermined maximum mowing speed. Second, the controller monitors the ground speed of the mower. Third, when the controller determines that the cutting reels are operative and the ground speed is approaching the maximum mowing speed of the mower, then operator perceptible warning is actuated to alert the operator. Fourth, if the speed exceeds the predetermined maximum mowing speed, then the controller disables the reels from mowing. In the preferred embodiment, the controller disables the reels by shutting off the hydraulic fluid flow from the hydraulic motors which rotate the cutting reels. Fifth, the operator is forced to take certain corrective action to re-enable the cutting reels. In the preferred embodiment, the operator is forced to move the cutting reel engagement lever to its on position.

11 Claims, 5 Drawing Sheets

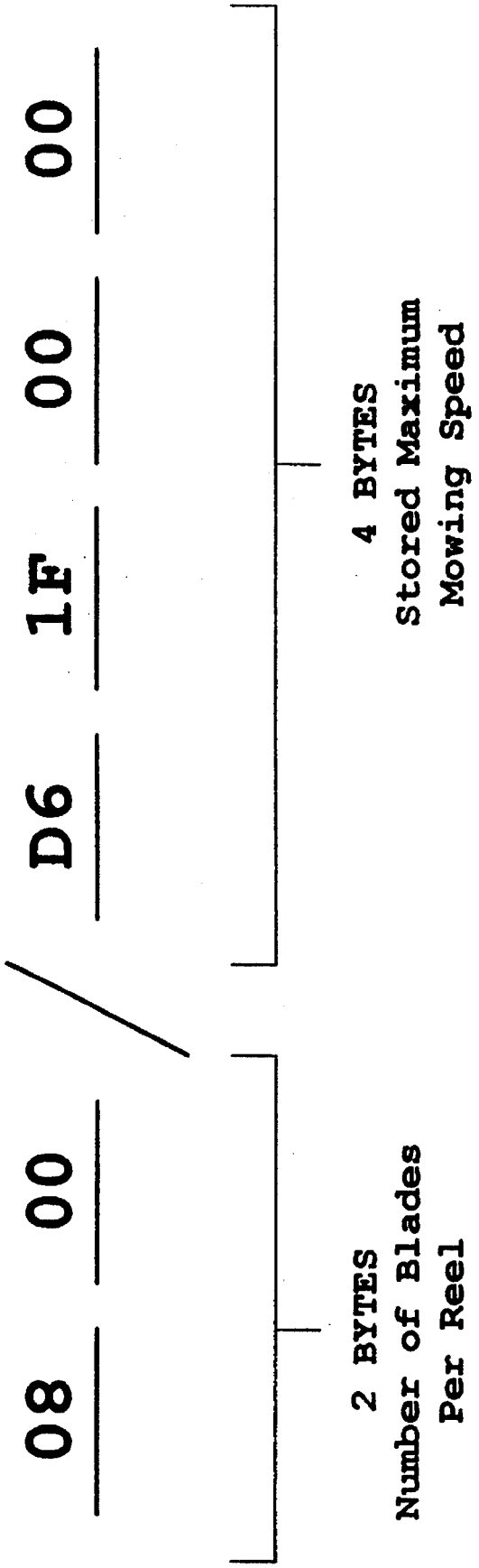

SUPERVISOR SWITCH FOR TURF MOWER

FIELD OF THE INVENTION

The present invention relates generally to turf mowers, more particularly to a turf mower switch system for disabling the cutting units of the turf mower if the ground speed of the turf mower exceeds a predetermined speed and/or is less than a predetermined speed, and most particularly to a supervisor switch system for disabling the cutting reels of a reel type turf mower when the ground speed of the turf mower exceeds a predetermined speed.

BACKGROUND OF THE INVENTION

Rotary mowers and reel mowers are the two general types of turf mowers. Rotary mowers are generally used in high volume cutting environments and provide a rough cutting of the turf. When a more precise, finished cut is required, generally reel mowers are utilized. While the present invention relates primarily to reel mowers, those skilled in the art will recognize that the present invention may be useful in other styles of mowers as well. Therefore, while the preferred embodiment and examples will focus on reel mowers, the present invention should not be construed as so limited.

In a reel mower, there are one or more reels which rotate about a horizontal axis. The reel(s) operates in conjunction with a relatively stationary bedknife to shear off the grass blades. Generally, to maintain consistent quality of cut and to optimize the "clip" of the cut turf, the reel should be rotated more quickly with increasing ground speed. As used herein, the rotation of the reel will be referred to "reel speed." For a more detailed description of controlling reel speed in response to ground speed and to optimize the clip of the cut turf, reference may be had to the commonly assigned application titled *Electronic Control for Turf Maintenance Vehicle*, filed Jan. 3, 1992 (U.S. application Ser. No. 07/816,816) which is hereby incorporated herein by reference.

Typically, commercial reel mowers may be operated at certain top end or maximum ground speeds during transport (reels up). In the course of mowing, transporting the mower between areas to be cut, etc, operators need to have the maximum amount of control over ground speed. On the other hand, if the ground speed is too fast during mowing operations, the "clip" can become excessive (i.e., it degrades) and the cut turf can take on a poor appearance. That is, typically commercial turf mowers are designed so that they can travel at a ground speed greater than the preferred maximum mowing speed.

Therefore, supervisors prefer that operators mow at a ground speed less than the maximum possible speed of the mower. Also, the preferred mowing speed depends on the skill and experience level of the operator. For example, an experienced operator would know precisely when to raise and lower the cutting reel at the edge of a fairway when doing cross cutting, and therefore the more experienced operator may be capable of mowing at a faster ground speed. In fact, a supervisor might even want to establish a maximum mowing speed which is lower than the maximum "quality" mowing speed (i.e. the maximum speed possible while still maintaining an acceptable "clip").

It is a common perception, however, that slower mowing improves the final appearance of the turf. As noted in the Lonn et al application referenced above, there is generally a relationship between reel speed and ground speed which provides for optimized clip. Further, the luxury of cutting the turf slowly is usually not available since large amounts of turf are generally required to be cut in the least amount of time possible (in order to reduce the cost of maintaining the turf and maximizing play, among other factors) and to maximize the time that other activities can utilize the turf being maintained.

Accordingly, the maximum mowing speed at which a mower can travel while maintaining acceptable performance is important to establish. At speeds above the maximum mowing speed the cut turf takes on a poor appearance (e.g., the proper reel speed may not be possible and so the clip degrades), the speed may cause improper operation of the cutting units themselves (e.g., such as by bouncing over rough terrain), and the speed may cause a greater wear on the mower itself leading to more frequent mechanical breakdowns.

The prior art includes simple supervisor lock outs on vehicles. Such "lock outs" simply establish a maximum ground speed achievable by the vehicle. For example, some vehicles will lock out certain gears of a transmission (e.g., the top gear) by use of a keyed switch. Of course, there are also simple engine governors which limit the RPMs of an engine, thereby limiting the ground speed of a vehicle. However, each of these devices suffers from the drawback that maximum control and speed of the vehicle is altered.

Therefore, there is a need for a supervisor switch which does not affect the maximum ground speed of the mower. Further, such supervisor switch should establish a maximum mowing speed of the mower by disabling the reels if and when an operator exceeds a certain preselected ground speed.

SUMMARY OF THE INVENTION

The present invention provides for an automated supervisor switch device for maintaining a maximum ground speed during cutting operations. This speed will be referred to herein as the "maximum mowing speed." The present invention maintains the maximum mowing speed by disabling the cutting units if the speed is exceeded. Therefore, if an operator mows at speeds exceeding the predetermined maximum mowing speed, then the cutting units will be disengaged and the operator will be forced to repeat a mowing operation over the area in which the cutting units were disabled. This will tend to frustrate operators from exceeding the maximum mowing speed and promote mowing below the maximum mowing speed.

The present invention does not interfere with the maximum ground speed of the vehicle during non-cutting operations. For example, during transport, preferably the supervisor switch of the present invention is not operative. It is also contemplated that the present invention may provide for maintaining a minimum ground speed, either in addition to the maximum ground speed or in lieu of the maximum ground speed.

In a preferred embodiment of a device constructed according to the principles of the present invention, there is a controller apparatus located onboard a turf maintenance vehicle which monitors the ground speed of the vehicle and the enables of the cutting elements. However, those skilled in the art will appreciate that various other operative parameters of the vehicle may also be monitored by the controller apparatus.

First, a memory location is loaded with a predetermined maximum mowing speed. Second, the controller monitors the ground speed of the mower. Third, when the controller determines that the cutting reels are operative and the ground speed is approaching the maximum mowing speed of the mower, then an audio and/or visual warning is actuated to alert the operator. Fourth, if the speed exceeds the predetermined maximum mowing speed, then the controller disables the reels from mowing. In the preferred embodiment, the controller disables the reels by shutting off the hydraulic fluid flow from the hydraulic motors which rotate the cutting reels. Fifth, the operator is forced to take certain corrective action to re-enable the cutting reels. In the preferred embodiment, the operator is forced to move the cutting reel engagement lever to its off and on positions.

One feature of the present invention, is that it may be implemented in software in a manner which allows a supervisor to optionally utilize the supervisor switch by using a remote computer to program a maximum mowing speed. An advantage of the present invention is that it improves performance of the mower in regard to clip, and also improves durability of the mower.

According to one aspect of the invention, there is provided: an improved turf mower comprising: (a) a vehicle including means for determining the ground speed of the vehicle; (b) a cutting unit supported by the vehicle, the cutting unit including a movable cutting element; (c) motor means for rotating the cutting element; and (d) control means operatively coupled to the speed determining means and the motor means for establishing a preselected maximum mowing speed, wherein if the vehicle ground speed, as determined by the ground speed determining means, exceeds the preselected maximum mowing speed, then the motor means is not energized by the control means or is de-energized by the control means if the motor means was previously energized, whereby the rotating cutting element is stopped from rotating.

According to another aspect of the invention, there is provided: a method for controlling the mowing speed of a turf mower having a cutting element, comprising the steps of: a) determining an unacceptable mowing speed for the turf mower; b) determining the ground speed of the turf mower and providing a sensed ground speed signal to a controller device; c) comparing the sensed ground speed signal to the unacceptable mowing speed; and d) de-energizing the cutting element of the turf mower if the sensed ground speed signal is determined to be unacceptable.

These and other advantages and features which characterize the present invention are pointed out with particularity in the claims annexed hereto and forming a further part hereof. However, for a better understanding of the invention, the advantages and objects obtained by its use, reference should be made to the drawing which forms a further part hereof, and to the accompanying descriptive matter, in which there is illustrated and described a preferred embodiment of the present invention.

BRIEF DESCRIPTION OF THE DRAWING

In the Drawing, wherein like reference numerals and letters indicate corresponding elements throughout the several views:

FIG. 5 is a diagrammatic illustration of a memory location which stores the data related to the maximum mowing speed.

DETAILED DESCRIPTION OF THE INVENTION

Figure 1:
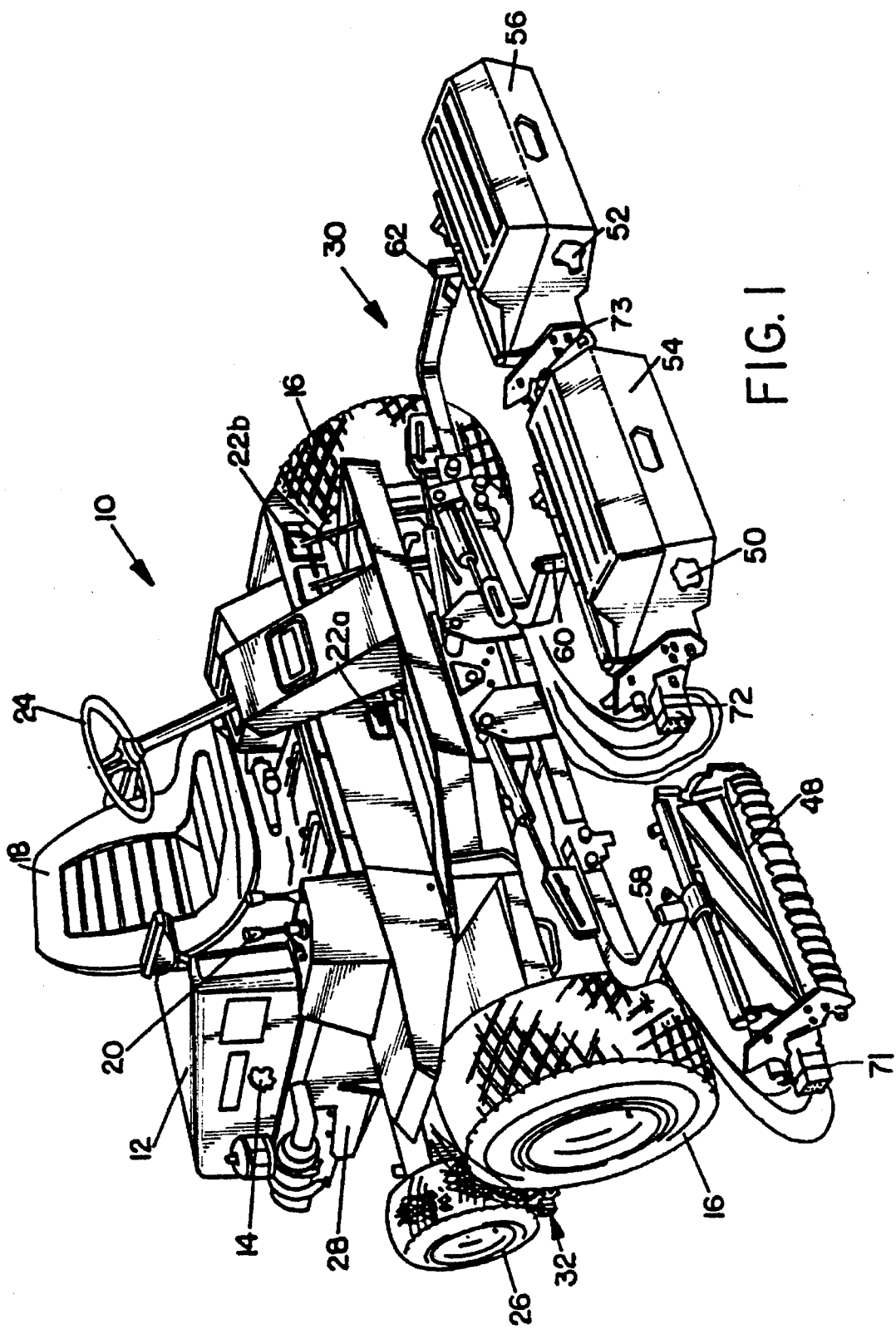
FIG. 1 is a perspective view of a commercial reel mower 10 in which environment a preferred embodiment of the present invention may reside.

The principles of this invention apply to the monitoring and active modification of the enablement and disablement of an operative system of a vehicle. The apparatus and method includes the updating and control of the operative system in accordance with predetermined criteria to achieve a desired maximum ground speed (and/or a minimum ground speed) during the performance of that operation. A preferred application for this invention is in the monitoring and control of the maximum mowing speed in a turf maintenance vehicle.

Although the example of mowing a golf course will be utilized herein, those skilled in the art will appreciate that such application is only one of many mowing type environments in which the principles of the present application might be utilized. Accordingly, the golf examples presented herein should not be construed in a limiting manner. Also, those skilled in the art will appreciate that although the present control device is illustrated in the drawing as residing on a particular turf mower having a predefined number of reels and blades per reel, it should be understood that any number of reels and blades per reel can be controlled by the present invention, as well as other styles of mowers and mulchers.

In order to better present and describe the preferred embodiment of the present invention, the detailed description of the supervisor switch apparatus and method will be deferred pending a discussion of a preferred embodiment turf mower on which the present invention might be used.

Referring first to FIG. 1, there is shown a typical commercial riding reel mower 10 with which the present invention may be used. As noted above, such mowers are typically utilized for cutting large areas such as golf courses, football fields, parks and the like. The mower 10 includes a rear housing 12 enclosing an engine compartment 14 which is hydraulically coupled via a transmission (best seen in FIG. 2) to a pair of front driving or traction wheels 16. The operator sits in a seat 18 positioned in front of the engine housing 12 and controls operation of the mower 10 by means of hand controls 20, foot controls 22a, 22b and a steering wheel 24 which is cooperatively connected to a pair of rear steering wheels 26, only one of which is shown. The rear steering wheels 26 are of relatively smaller diameter and tread than the front traction wheels 16, for purposes of better maneuverability.

Still referring to FIG. 1, the mower 10 includes a frame having a projecting forward platform on which the foot controls 22a, 22b and pedestal for steering wheel 24 are mounted. A front lift arm assembly 30 is mounted on the front end of frame 28 between the front wheels 16, while a rear lift arm assembly 32 is mounted on the frame between the front wheels and the rear wheels 26. As will be explained more fully below, the lift arm assemblies 30 and 32 include lightweight cutting reels mounted on pivotal lift arms that are normally biased by adjustable spring assemblies downwardly into contact with the turf. Hydraulic cylinders operate to raise and lower the lift arms between their extreme positions. The operation of the lift arm assemblies is discussed-more fully in U.S. Pat. No. 5,042,236, which is hereby incorporated herein by reference.

Cutting reels are mounted on the outer end of each of the lift arms of the front lift arm assembly 30. More particularly, cutting reel 48 is secured to the outer end of the right outboard lift arm 58, cutting reel 50 is secured to the outer end of the middle lift arm 60, and cutting reel 52 is mounted on the outer end of the left outboard lift arm 62. Each of the cutting reels 48, 50 and 52 is of substantially conventional construction, including hydraulically driven transverse blades positioned between front and rear transverse rollers. Such cutting reels 48, 50 and 52 are usually enclosed by grass shields and baskets, only two of which shields/baskets 54 and 56 are shown in FIG. 1 for the purposes of clarity. As noted above, each of the cutting reels move past a bedknife 113 (best seen in FIG. 3). Hereinafter, the reels will be described by the designation 48 for clarity.

The mower also includes a rear lift arm assembly 32 which is mounted on the lower frame 28 between the front wheels 16 and the rear wheels 26. The rear lift arm assembly 32 includes two lift arms (not shown) which are supported and biased downwardly by hydraulic actuators and adjustable spring assemblies respectively similar to those in front lift arm assembly 30.

Figure 2:
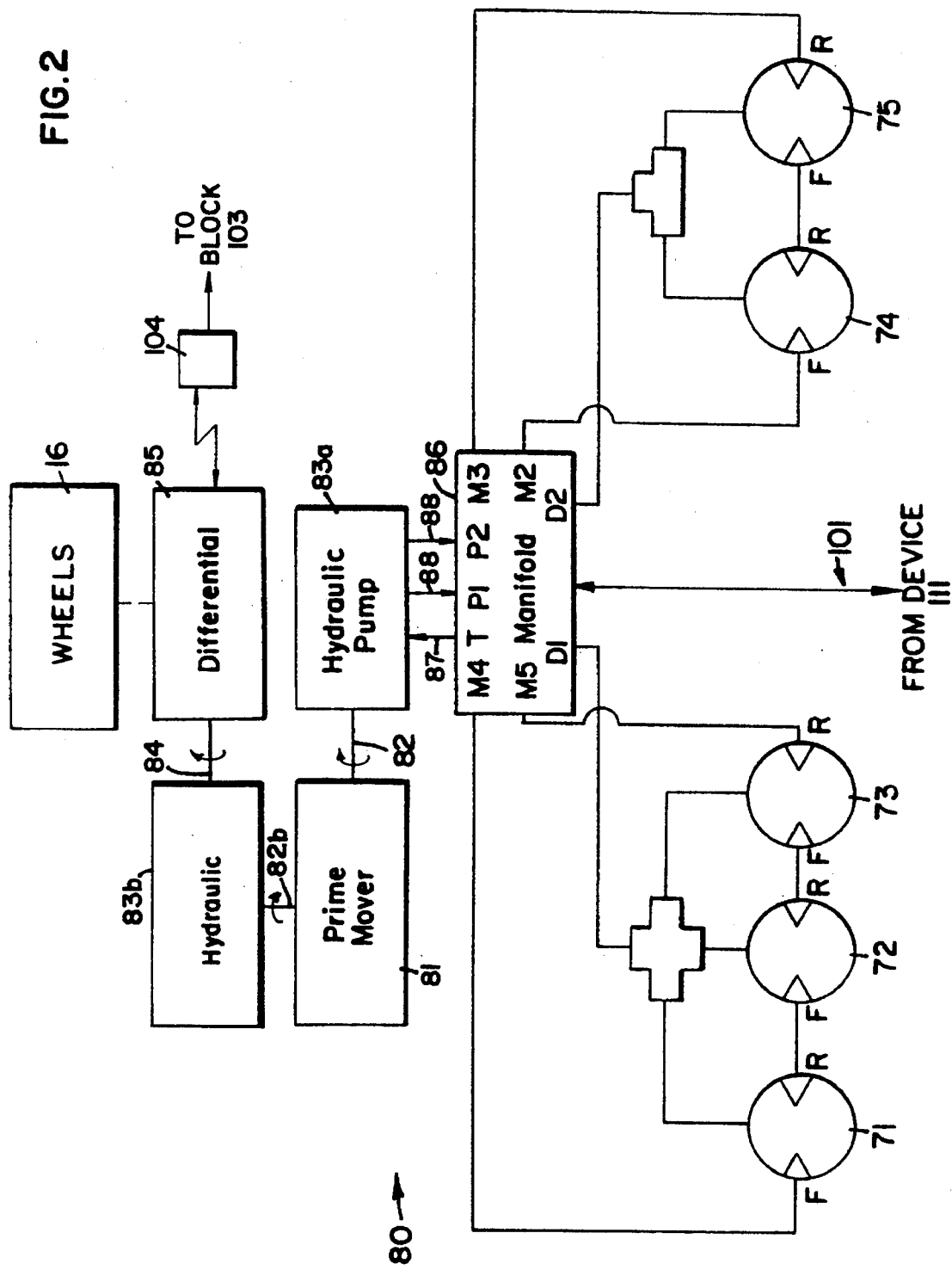
FIG. 2 is a block diagram illustrating the hydraulic fluid system of the mower 10 of FIG. 1.

Moving now to FIG. 2, there is illustrated the preferred hydraulic system 80. The hydraulic system 80 is energized by prime mover 81 which is cooperatively connected via drive shaft 82a to reel hydraulic pump 83a and via drive shaft 82b to transmission hydraulic pump 83b. Transmission hydraulic pump 83b is in turn connected to differential 85 via shaft 84. As those skilled in the art will appreciate, the differential 85 drives the wheels 16 in response to commands from an operator via the foot control 22a. Reel hydraulic pump 83a is connected to manifold 86 via input and output lines 87, 88 respectively and includes a hydraulic fluid reservoir tank. In the preferred embodiment, hydraulic reel pump 83a may be manufactured by Webster Fluid Power Products, Inc. of Easley, S.C., under the model designation 49913-6.

The manifold 86 includes connections for various devices and apparatus driven by hydraulics on the mower 10 including lifting the reels on the front lift arm assembly 30 and rear lift arm assembly 32. The hydraulic connections are illustrated with greater clarity in the Lonn et al application, incorporated by reference above.

The reels are driven hydraulically via hydraulic motors 71 through 75. In the preferred embodiment, the hydraulic motors may be of the type manufactured by Webster Fluid Power Products, Inc. of Easley, S.C., under the model designation 152-10000353 and are preferably of the constant displacement type. The motors 71-75 are cooperatively connected to the reels in a well known manner such that when hydraulic fluid passes through the reel motors 71-75, the reels 48 rotate.

Still referring to FIG. 2, controller 100 (discussed in more detail below and best seen in FIG. 3) is cooperatively connected to the manifold 86 via line 101 to operate various valves within manifold 86. The valves (best seen diagrammatically in FIG. 3) control the hydraulic fluid flow to hydraulic motors 71-75. A more detailed discussion of the hydraulic fluid flow and operation of the valves is provided in the Lonn et al application, incorporated by reference above.

Figure 3:
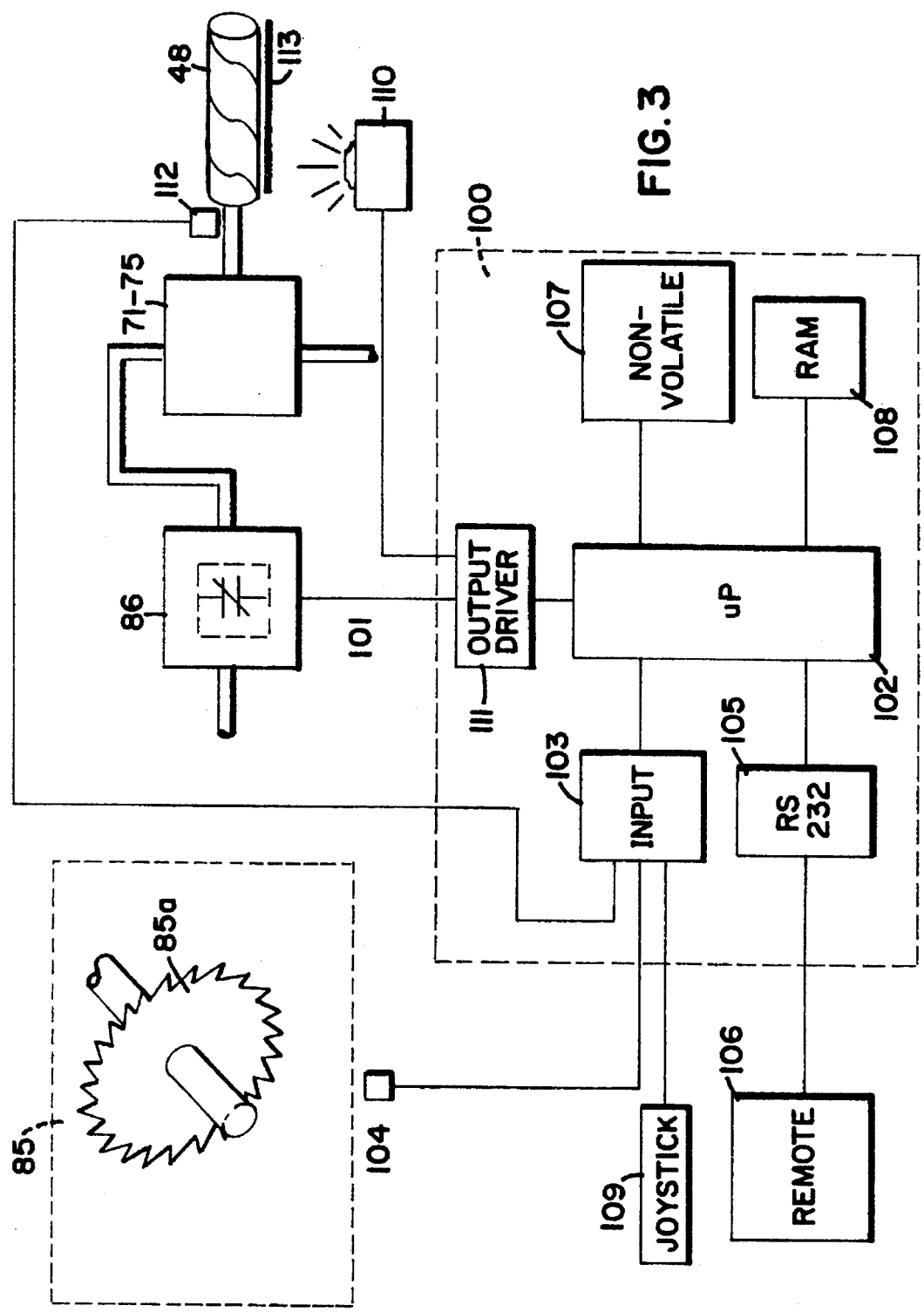
FIG. 3 is a diagrammatic block diagram illustrating the relationship between the mechanical and electronic components of a device constructed according to the principles of the present invention.

Referring to FIG. 3, certain inputs are provided to the controller 100. The controller 100 receives input signals from input block 103 which includes proper buffers, A/D devices, etc. The input signals are originally generated by encoder devices, such as optical encoders, Hall effect devices, etc. Accordingly, reel-speed and ground-speed are determined and provided to controller 100.

The process of determining the number of revolutions of transmission gear teeth and locating pickups on rotating objects such as the transmission gear 85a and reels 48 via optical encoders, Hall Effect devices, etc. is well known in the art and so will not be described in detail herein. Preferably Hall effect devices are used to determine the ground speed and reel speed although any number of other type devices may be used as will be appreciated.

In the preferred embodiment, the actual ground speed is determined by an interrupt driven input. More specifically, the Hall effect sensor 104 provides a signal for each passage of a gear tooth past the sensor. Each time that eight gear teeth pass the sensor 104, then an interrupt occurs in the input block 103 which provides the microprocessor 102 with a time period corresponding to the time required for eight transmission gear teeth to move past the sensor 104. Since the distance that the mower 10 moves is known for each fraction of revolution of the transmission gear 85a and the time is known (since the period is known), then the rate of speed may be calculated.

It will be appreciated by those skilled in the art that the speed measured by the Hall effect sensor 104 may vary slightly from the "actual ground speed" of the mower 10 due to tolerance variations in the differential 85 and slipping of the wheels 16 (if any), among other factors. While radar and laser systems, etc. might be used to determine a more precise actual ground speed, it is thought that the results from the Hall effect sensor 104 measurement provide an accuracy which is acceptable. Accordingly, the measured speed is referred to herein as the "actual ground speed."

RS-232 interface block 105 provides a two-way communication port to microprocessor 102 for diagnostics, testing, and for loading the maximum mowing speed. Thus, a remote computer 106 may be utilized to provide field-loaded software instructions to reside in non-volatile memory block 107 and to implement and/or change the predetermined maximum cutting speed.

In the preferred embodiment, the microprocessor 102 may be of the type manufactured by Intel having a model designation 80C196KB. The microprocessor 102 is preferably a 16 bit microcontroller. Included with microprocessor 102 is nonvolatile memory block 107 and random access memory block 108. Controller 100 is comprised of blocks 102, 103, 105, 107, 108, and 111.

Output is provided to an operator perceptible indicia device 110, such as an out of range lamp preferably located in a position easily visible to an operator in order to notify the operator of a fault condition in the clip control and/or to warn the operator that the maximum mowing speed is being approached and/or exceeded. Those skilled in the art will appreciate that buzzers, horns, vibration devices, etc. might also be used in addition to or separately from the preferred out of range lamp illustrated in FIG. 3. It will also be appreciated that reverse logic might be used in activating the operator perceptible indicia such that the light, horn, etc. could be turned "off," rather than being turned "on" when a condition occurs. Therefore, while the operator perceptible indicia is discussed herein as being energized, those skilled in the art will appreciate that negative logic (to turn the indicia off) is to be included in such language.

Output devices block 111 preferably includes several high speed pulse width modulated drivers for controlling the reel speed in a manner related to the measured ground speed during mowing operations in order to optimize the clip. The output from the output drives 111 is also used to enable the reels 48 if the maximum mowing speed is not exceeded. The controller 100 preferably utilizes a feedback control loop to maintain the actual reel speed at a target speed. The feedback control loop is described in more detail in the Lonn et al application, incorporated by reference above.

While not specifically detailed in FIG. 3, it will be understood that the controller 100 includes various logic gates, flip-flops, etc., and must be properly connected to appropriate bias and reference supplies so as to operate in its intended manner. Similarly, it will be understood that appropriate memory, clock oscillator, buffer and other attendant peripheral devices are to be properly connected to controller 100 so as to operate in its intended manner.

Figure 4:
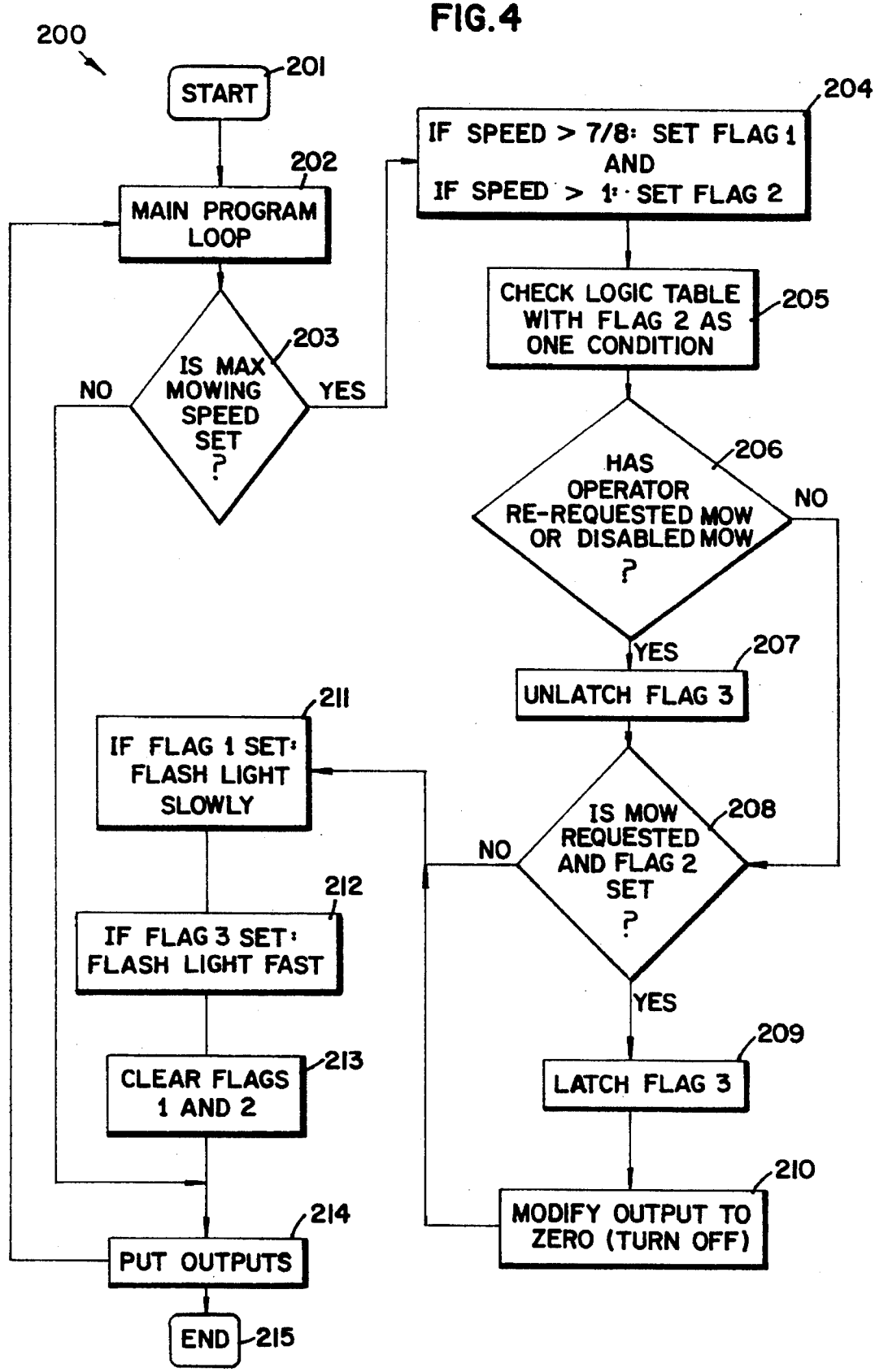
FIG. 4 is a logic flow diagram for the programming steps utilized by the controller 100 of FIG. 3 which implements the supervisor switch functions.

Having now described in detail the hydraulic operation of the reels and the interconnection of the electronic controller 100, a discussion will now be presented describing the logic flow of the microprocessor 102 of controller 100 in carrying out the supervisor switch apparatus and method. In a preferred embodiment of a device constructed according to the principles of the present invention, the logic means comprises a microprocessor 102 which sequentially polls the inputs, including the asynchronous interrupts. A logic flow diagram of an embodiment of the program logic which might be resident in the microprocessor 102 or stored in nonvolatile memory block 107 or RAM 108 is illustrated in FIG. 4, wherein the logic diagrams is shown generally at 200. The logic flow diagram 200 generally illustrates the steps taken to analyze the logical status of the various inputs and provide outputs to enable/disable the reels 48.

Although the microprocessor 102 will be characterized as "proceeding" from logical block to logical block, while describing the operation of the program logic, those skilled in the art will appreciate that programming steps are being acted on by microprocessor 102.

In the preferred embodiment, a maximum mowing speed is provided to the controller 100. Preferably, this information is input by means of a separate/remote PC 106 which is connected by means of a serial cable to an RS-232 port 105 of the controller 100 which resides on the turf mower 10. The controller 100 preferably stores the maximum mowing speed in its EEPROM type non-volatile memory 107.

In the preferred embodiment, the remote PC 106 performs the calculations necessary for the desired maximum mowing speed. For example, since the processor 102 is measuring a period of time per number of pulses from gear teeth passing a sensor 104 (as described above), a speed entered by an operator must be transformed into a period. For example, if six (6) miles per hour were the maximum mowing speed, then the remote PC would calculate the period between eight (8) gear teeth which is 0.0163 second (as described above). This number can be converted into an integer number of 1850 (this number will correspond to the timer count for the interrupt and, for example, preferably assumes 2 microseconds per timer count). This number can then be converted into a hexadecimal number 1FDG for storage in the six byte memory location illustrated in FIG. 5. The first two bytes of the memory location are used for storing the number of blades on the reel, in hexadecimal. The leftmost byte as shown in FIG. 5 is the least significant byte in accordance with the preferred embodiment memory storage methodology.

Alternately, the controller 100 may automatically determine the maximum mowing speed by means of a switch or by calculating the number. The number of blades per reel may be used by the controller 100 for automatically determining the maximum mowing speed, along with other variables (e.g., height of cut).

Turning now to FIG. 4, first, at 200 there is illustrated a main controller program loop which begins at block 201. Proceeding to block 202, the controller 100 determines the proper pulse width modulated signals to control the reel speed relative to the ground speed (as more fully discussed in Lonn et al, incorporated by reference above). The determined output is not yet provided by processor 102 to block 111 and thus, the reels are not yet enabled. Next at block 203 the processor 102 determines if a maximum mowing speed has been set in memory 107 as discussed above. Since the default value is preferably all logical ones, the processor 102 need only perform a logical compare with a hexadecimal FFFF to determine if a maximum mowing speed has been set. If a maximum mowing speed has been set, then the program sets two flags after the compare operation at block 204. A first flag is set if the actual ground speed is greater than a predetermined fraction of the maximum mowing speed (in the preferred embodiment ⅞). A second flag is set if the actual ground speed is greater than the set maximum mowing speed (shown in FIG. 4 as equalling 1 times the maximum mowing speed).

If a mowing speed has not been set, then the program proceeds to block 214 where the outputs are provided to device 111. From block 214, if the mower 10 is to be shut off, the processor ends at block 215. Otherwise the processor 102 proceeds to block 202 to continue the main program loop.

The maximum mowing speed subroutine continues at block 205, after Flag 1 and Flag 2 are properly set, by checking a logic table to determine if the reels 48 should be engaged. Flag 2 is used as one condition which must be met prior to enabling the reels 48 or keeping the reels 48 enabled (i.e., if the maximum mowing speed has been set and Flag 2 has been set, then the logic table indicates that the reels 48 should not be operative/enabled).

Proceeding to block 206, the processor 102 determines whether the operator has re-requested mowing or has disabled mowing. Whether the operator has requested mowing or has disabled mowing is determined by controller 100 via the engagement of joystick 109 (generally seen in FIG. 1 as one of the hand controls 20) and the sensor 112. As noted above, once the reels 48 are disabled, the operator must positively move the joystick 109 in order to reenable the reels 48. However, the operator may alternately determine that mowing should be disabled. As noted above, the supervisor switch device does not operate if mowing is not requested. Therefore, if the operator has re-requested mow or has disabled mow, then the processor 102 proceeds to block 207 to unlatch Flag 3.

If the operator has not re-requested mow or disabled mow, the processor 102 proceeds to block 208 where it determines if mow is requested and Flag 2 is set (i.e., is the maximum cutting speed being exceeded while mow is requested). If yes, the processor 102 proceeds to block 209 where Flag 3 is latched and thereafter to block 210 where the pulse width modulated signal is modified. It will be understood that Flag 3 may have been previously latched and so block 209 may not change the status of Flag 3.

As will be appreciated by those skilled in the art, the signal is to be sent to the manifold 86 and appropriate valves later in the logical flow (the outputs are preferably sent at block 214). Further, while the signal may be considered to be "turned off" or modified to zero, it will be appreciated that various logical schemes may be utilized and that the desired function is to interrupt the hydraulic fluid flow from the manifold 86 to the hydraulic motors 71–75. In this manner, reels 48 are disabled or kept from becoming enabled. It will be further appreciated that as used herein, the language regarding de-energizing or disabling the reels also includes not originally energizing or enabling the reels in those instances that the maximum cutting speed is being exceeded prior to the operator requesting a mowing operation.

If mow has not been requested and Flag 2 set, then the processor 102 continues to block 211 where if Flag 1 is set, then the out of range lamp 110 is flashed slowly. Continuing to block 212, if Flag 3 is set, then the out of range lamp is flashed quickly. It will be appreciated that if Flag 3 is set, then the instruction to flash quickly will override the setting to flash slowly at block 211.

Proceeding to block 213, Flag 1 and Flag 2 are cleared and the outputs are sent at block 214. As discussed below, if the mower 10 is to be turned off, the processor 102 continues to block 215, otherwise it proceeds to block 202 to continue the program loop.

It will be appreciated that the processor compares a fraction of the stored maximum mowing speed with the actual speed at block 204. In the preferred embodiment, the fraction is ⅞, however, any fraction which provides an indication to the operator that the maximum mowing speed is being approached might be used. If the actual speed exceeds the fractional maximum mowing speed then the processor 102 begins to flash the out-of-range light 110 slowly. In the preferred embodiment, the "out of range" light is located on the control panel and may flash at a rate of ¹⁄₁₀ of a second on and ⁹⁄₁₀ of a second off, although a wide variety of actual rates might be used.

At block 212, if the actual ground speed exceeds the maximum mowing speed preselected by the supervisor, the out of range light 110 starts to flash rapidly (e.g., ¹⁄₁₀ of a second on, ¹⁄₁₀ of a second off, etc., etc.). The reel(s) 48 is/are de-energized to actually prevent the operator from mowing at this speed. The mower is "latched" into this state until the operator re-enables the reels 48 by positively moving the joy stick 109 on the control panel of the mower 10, however the ground speed is not affected. The reels are re-energized only if the mowing speed drops below the maximum mowing speed. It will be appreciated that the reels 48 may be deactivated by sending the proper pulse width signal to block 111 (or no pulse width signal), depending upon the scheme used by the valves in manifold block 86.

It will be appreciated by those skilled in the art that although the present invention has been illustrated with a software-based control system, it may also be implemented with discrete electrical components. Similarly the apparatus could be implemented mechanically (e.g., with a governor device actuating a switch to cut off the motors), hydraulically (e.g., by pumping oil across an orifice to generate a flow rate signal which pops a pressure relief valve), or hard-wire electronically or electrically. Additionally, while the preferred embodiment determines whether the operator has requested a mowing operation or re-requested a mowing operation, and senses the status of the mowing operation by determining the position of the joystick 109, the present invention might also be implemented by merely comparing the actual ground speed against a predetermined speed or range.

Further, it is to be understood that even though numerous characteristics and advantages of the present invention have been set forth in the foregoing description, together with details of the structure and function of the invention, the disclosure is illustrative only and changes may be made in detail, especially in the reel drive system. For example with regard to the latter, variable displacement or electric motors might be used. Further, although reels which include a certain number of blades are presented herein for purposes of illustration, other configurations might be used. Also, the invention may also provide for a minimum ground speed either in addition to or in lieu of the maximum. Other modifications and alterations are well within the knowledge of those skilled in the art and are to be included within the broad scope of the appended claims.

I claim:

1. An improved turf mower comprising:
   (a) a vehicle including means for determining the ground speed of the vehicle;
   (b) a cutting unit supported by the vehicle, the cutting unit including a movable cutting element;
   (c) motor means for rotating the cutting element; and
   (d) control means operatively coupled to the speed determining means and the motor means for establishing a preselected maximum mowing speed, wherein if the vehicle ground speed, as determined by the ground speed determining means, exceeds the preselected maximum mowing speed, then the motor means is not energized by the control means or is de-energized by the control means if the motor means was previously energized, whereby the rotating cutting element is stopped from rotating.

2. The mower of claim 1, wherein the motor means is a hydraulic motor.

3. The mower of claim 1, wherein the control means is an electronic controller including a microprocessor.

4. The mower of claim 1, wherein the cutting unit is a reel blade which rotates about a longitudinal axis past a relatively stationary bedknife.

5. The mower of claim 1, further comprising operator perceptible indicia, wherein the control means is operatively connected to the operator perceptible indicia for alerting the operator when the preselected maximum mowing speed is being approached or exceeded.

6. An improved turf mower comprising:
   (a) a vehicle including means for determining the ground speed of the vehicle;
   (b) a cutting unit supported by the vehicle, the cutting unit including a movable cutting element;
   (c) motor means for rotating the cutting element;
   (d) control means operatively coupled to the speed determining means and the motor means for establishing a preselected maximum mowing speed, wherein if the vehicle speed, as determined by the ground speed determining means, exceeds the preselected maximum mowing speed, then the motor means is not energized by the control means or is de-energized by the control means if the motor means was previously energized, whereby the rotating cutting element is stopped from rotating; and
   (e) reset means, operatively connected to the control means, for providing a reset signal to the control means, wherein if the vehicle ground speed is less than the preselected maximum mowing speed when the reset means are activated, then the control means re-energizes the motor means.

7. The mower of claim 6, wherein the reset means is a joystick actuated by an operator of the mower.

8. The mower of claim 1, wherein:
   a) the motor means is a hydraulic motor;
   b) the control means is an electronic controller including a microprocessor; and
   c) the cutting unit is a reel blade which rotates about a longitudinal axis past a relatively stationary bedknife.

9. The mower of claim 8, further comprising operator perceptible indicia, wherein the control means is operatively connected to the operator perceptible indicia for alerting the operator when the preselected maximum mowing speed is being approached or exceeded.

10. The mower of claim 8, further comprising reset means, operatively connected to the control means, for providing a reset signal to the control means, wherein if the vehicle ground speed is less than the preselected maximum mowing speed when the reset means are activated, then the control means re-energizes the motor means.

11. The mower of claim 10, wherein the reset means is a joystick actuated by an operator of the mower.

* * * * *